United States Patent Office 2,839,528
Patented June 17, 1958

2,839,528

PROCESS FOR THE PARTIAL ELIMINATION OF OXO GROUPS IN STEROIDS

Albert Wettstein, Basel, Charles Meystre, Arlesheim, and Jean-René Billeter, Basel, Switzerland, assignors to Ciba Pharmaceutical Products, Inc., Summit, N. J.

No Drawing. Application October 7, 1953
Serial No. 384,782

Claims priority, application Switzerland October 15, 1952

11 Claims. (Cl. 260—239.55)

This invention relates to the manufacture of compounds of the steroid series and more particularly to a process for the partial removal of oxo groups in α-dioxo-compounds of the steroid series, their enols and enolates.

One of the most usual methods for the reductive removal of oxo groups is the process of Wolff-Kishner (R. Adams, Organic Reactions, vol. IV, 378 (1949)), which has later been modified and improved by Huang-Minlon (J. Am. Chem. Soc. 71, 3301 (1949)). In the latter reaction, the carbonyl compound is boiled under reflux for about ½ hour in di- or tri-ethylene glycol together with 10 percent alkali hydroxide and an excess of hydrazine hydrate. Distillation from the product of the solvent mixture is then carried out until the residue has a boiling temperature of about 200° C., whereupon it is further boiled under reflux for several hours.

Even the described improved modification of the reaction, in the case of α-dioxo-compounds of the steroid series or their enols, especially the 11:12-diketones or the $\Delta^{9:11}$-11-hydroxy-12-ketones, leads to difficultly reproducible results for the reason that difficultly separable mixtures are often produced. The course of the reaction is shown to be very variable with small alterations of the reaction conditions. If the reaction temperature is selected only a little too high both oxygen functions are eliminated (see, for example, Moffet and Hunter, J. Am. Chem. Soc. 73, 1973, 1951). On the other hand if the reaction temperature is too low by a small amount there is no removal whatever of oxygen functions.

The present invention is based on the surprising observation that a partial removal of oxo-groups from α-dioxo-compounds of the steroid series, their enols or enolates, can be effected smoothly and with good yield when the specified starting materials are heated with hydrazine or its derivatives to above about 160° C. in the absence of basic alkali metal compounds.

There may be used as starting materials α-dioxo-compounds of the steroid series which contain the two adjacent oxo-groups for example in 2- and 3-position, 3- and 4-position, 6- and 7-position, 16- and 17-position, 20- and 21-position and especially 11- and 12-position, or the corresponding enols, such as the $\Delta^{9:11}$-11-hydroxy-12-ketones or $\Delta^{15}$-16-hydroxy-17-ketones or their enolates, for example metal enolates, enol acylates or enol ethers. The steroids may be derived, for example, from the oestrane, androstane, testane, aetiocholane, pregnane, spirostane, furostane, bufostane, cholane, cholestane, nor- and bisnor-cholestane or ergostane series or from their stereoisomers and may contain, in addition to the two adjacent oxo groups, further substituents in the customary positions. As starting materials there are suitable above all salts of 11:12-diketo-cholanic acids.

The reaction according to the present invention takes place with hydrazine or its derivatives, such as hydrazine hydrate or semicarbazide or their salts, for example acetates, chlorides or sulfates, if desired together with at the most the equivalent quantity of alkali as an acid binder. It can be carried out, for example, in relatively low boiling solvents, such as low boiling alcohols, for example ethanol, propanol, butanol, hydrocarbons, for example benzene or xylene, or dioxane, under pressure, that is to say in a bomb tube or autoclave, at a temperature above about 160° C. A simple process consists in that the reaction is carried out by heating without pressure in such solvents as boil above about 160° C., such as glycol, di- or poly-ethylene glycol, propylene glycol or benzyl alcohol. It is advantageous to heat the mixture of starting material, solvent and hydrazine or its derivative, first for about ½ hour to the boiling temperature, which may lie below about 160° C., and then to distil off a portion of the solution for removal of the relatively low boiling fractions, such as water or hydrazine, and then to heat the residue, in general for a few hours, for example, about 2 to 6 hours to above about 160° C.

The working up is very simple, for example, by pouring the reaction mixture obtained into water and taking up in a low boiling organic solvent by steam distillation or by vacuum distillation.

The yields of the reaction products produced by partial removal of oxo-groups, in contradistinction to the known processes, are very good and can be reproduced without difficulty. Secondary conversions such as may otherwise take place easily under the action of the strong alkalies, are avoided to a far-reaching extent in the present process.

The following examples illustrate the invention, the relation between parts by weight and parts by volume being the same as that between the gram and the cubic centimeter:

Example 1

10 parts by weight of 3β-hydroxy-11:12-diketo-iso-allo-spirostane which is present to some extent in the form of the enol, are boiled under reflux for 30 minutes with 400 parts by volume of glycol and 20 parts by volume of hydrazine hydrate. Then 100 parts by volume of the solvent mixture are distilled off, the residue boiled for 3 hours under reflux, the cooled solution treated with water and the suspension obtained extracted by shaking with an ether-chloroform mixture (4:1) and the ether-chloroform solution washed with water, dried and evaporated. From the ether or ether-pentane solution of the residue, 6.5 parts by weight of 3β-hydroxy-11-keto-iso-allo-spirostane of melting point 216–227° C. crystallize in the form of needles. On recrystallization from methanol, the melting point is raised to 229–232° C.; $[\alpha]_D^{24} = -29.5°$ in chloroform.

The starting material was prepared by oxidation of pure 3β:12 - dihydroxy - 11 - keto - iso - allo - spirostane with bismuth trioxide ($Bi_2O_3$) in boiling glacial acetic acid and recrystallization only once from methanol.

Example 2

10 parts by weight of 3β-hydroxy-11:12-diketo-iso-allo-spirostane which is present partly in the form of the enol, are boiled under reflux for 30 minutes with 400 parts by volume of propylene glycol and 20 parts by volume of hydrazine hydrate. 100 parts by volume of the solvent mixture are then distilled off and the residue boiled for 6 hours further under reflux. The cooled solution is worked up as in Example 1, whereby the 3β-hydroxy-11-keto-iso-allo-spirostane is produced in the same quantity and quality.

Example 3

10 parts by weight of 3β-hydroxy-11:12-diketo-iso-allo-spirostane, which is present in part of the form of the enol, are boiled under reflux for 30 minutes with 400 parts by volume of diethylene glycol and 20 parts by volume of hydrazine hydrate. Then 100 parts by volume of the solvent mixture are distilled off. The residue is boiled for a further 2 hours under reflux. The solution is then cooled and worked up as in Example 1, whereby the 3β-hydroxy-11-keto-iso-allo-spirostane is obtained in the same quantity and quality.

*Example 4*

10 parts by weight of 3β-hydroxy-11:12-diketo-iso-allo-spirostane, which is present in part in the form of the enol, are boiled under reflux for 30 minutes with 400 parts by volume of benzyl alcohol and 15 parts by volume of hydrazine hydrate. Thereupon 100 parts by volume of the solvent mixture are distilled off and boiling continued for a further 2 hours under reflux. The solution is then treated with steam and the non-volatile residue taken up in an ether-chloroform mixture (4:1). The ether-chloroform solution is dried and evaporated. By recrystallization of the residue from ether or an ether-pentane mixture, 6.9 parts by weight are obtained of the 3β-hydroxy-11-keto-iso-allo-spirostane of melting point 216–227° C. which on further recrystallization from methanol is raised to 229–232° C.

Instead of hydrazine hydrate semi-carbazide can be used for the reaction, or also corresponding salts such as semi-carbazide acetate or hydrazine sulfate, in which case the equivalent quantity of alkali can be added as an acid binder.

*Example 5*

10 parts by weight of the 11-enol-acetate of 3β-acetoxy-11:12-diketo-iso-allo-spirostane are boiled under reflux for 30 minutes with 10 parts by volume of hydrazine hydrate and 400 parts by volume of diethylene glycol. So much of the solvent is now distilled off that the boiling temperature rises to 220–230° C. and then the solution is heated for a further 2 hours under reflux. The cooled solution is then treated with water and the suspension produced extracted by shaking with an ether-chloroform mixture (4:1). The ether-chloroform solution is washed with water, dried and evaporated. The residue is crystallized from methanol or from isopropyl ether, whereby the 3β-acetoxy-11-keto-iso-allo-spirostane of melting point 223–227° C. is obtained.

*Example 6*

20 parts by weight of $\Delta^{23:24}$-3α-acetoxy-11:12-diketo-24:24-diphenyl-cholene, part of which is in the form of the enol, are boiled for 30 minutes under reflux with 60 parts by volume of ethyl alcohol, 10 parts by volume of hydrazine hydrate and 160 parts by volume of triethylene glycol. 65 parts by volume of the solvent mixture are then distilled off, and the remainder heated to 230° C. for another 2 hours, cooled and poured into water. The precipitated reaction product is extracted with ether, the ethereal solution washed with water, dried and evaporated. The residue (18.5 parts by weight) is dissolved in 40 parts by volume of pyridine and mixed with 20 parts by volume of acetic anhydride. The solution is allowed to stand for 5 hours at room temperature and then concentrated in vacuo. The acetylation product is taken up in ether, washed with dilute hydrochloric acid, sodium carbonate solution and water, and concentrated to a small volume. 100 parts by volume of ethyl alcohol are added, 25 parts by volume are evaporated and the remainder allowed to cool. 13.4 parts by weight of $\Delta^{23:24}$-3α-acetoxy-11-keto-24:24-diphenyl cholene of melting point 168–169° C. crystallize, $[\alpha]_D = +77°$ in dioxane.

The $\Delta^{23:24}$-3α-acetoxy-11:12-diketo-24:24-diphenyl-cholene used as starting material can be prepared as follows:

160 parts by weight of bismuth-trioxide, 160 parts by volume of glacial acetic acid and 1500 parts by volume of chlorobenzene are heated to the boil while stirring and 300 parts by volume of liquid distilled off in the course of 1 hour until the distillation temperature exceeds 120° C. After this, 71.6 parts by weight of $\Delta^{23:24}$-3α-acetoxy-12β-hydroxy-11-keto-24:24-diphenyl-cholene are dissolved in 50 parts by volume of chlorobenzene and 300 parts by volume of glacial acetic acid added. While stirring, another 300 parts by volume of solvent are distilled off in the course of 1–1½ hours until the distillation temperature exceeds 120° C., the color of the reaction mixture changing from white to gray. The mixture is then cooled and filtered, the clear filtrate is evaporated and the residue recrystallized from isopropyl ether. There are obtained 48.5 parts by weight of $\Delta^{23:24}$-3α-acetoxy-11:12-diketo-24:24-diphenyl-cholene of melting point 142–144° C., $[\alpha]_D^{23°} = +100°$ (c.=1 in dioxane).

On evaporation and acetylation of the residue with boiling acetic anhydride the mother liquors yield 19.4 parts by weight of $\Delta^{23:24}$-3α-acetoxy-11:12-diketo-24:24-diphenyl-cholene-11-enol acetate of melting point 165–167° C., $[\alpha]_D^{25°} = +125°$ (c.=1 in dioxane).

*Example 7*

28 parts by weight of 3α-hydroxy-11:12-diketo-cholanic acid, part of which is in the form of the enol, are converted into the sodium salt by means of 70 parts by volume of normal caustic soda solution and the solution mixed with 14 parts by volume of hydrazine hydrate and 240 parts by volume of triethylene glycol. The whole is boiled for 45 minutes, 73 parts by volume of the mixture are distilled off and the remainder heated to 170° C. for 2 hours. It is then allowed to cool, 30 parts by volume of concentrated hydrochloric acid are added and 400 parts by volume of water added dropwise in the course of 30 minutes. The precipitated reaction product is dissolved in a solution of 5 parts by weight of sodium hydroxide in 250 parts by volume of water, the solution stirred for 15 minutes with Hyflo (diatomaceous earth filter aid), suction-filtered, and introduced dropwise at 80° C. into 100 parts by volume of acetic acid and 150 parts by volume of water. There are obtained 24.7 parts by weight of 3α-hydroxy-11-keto-cholanic acid of melting point 215–218° C. $[\alpha]_D = +68°$ (in alcohol).

What is claimed is:

1. A process for the partial removal of oxo-groups, which comprises heating a member of the group consisting of an 11,12-diketo-steroid, enols and enolates thereof, said 11,12-diketo-steroid being a member of the group consisting of steroids of the oestrane, androstane, testane, aetiocholane, pregnane, spirostane, furostane, bufostane, cholane, cholestane, nor- and bisnor-cholestane and ergostane series, to a temperature above about 160° C. with a member of the group consisting of hydrazine and derivatives thereof in the absence of a basic alkali metal compound.

2. A process according to claim 1, wherein $\Delta^{9,11}$-11-hydroxy-12-keto-steroids are used as starting material.

3. A process according to claim 1, wherein enolates of $\Delta^{9,11}$-11-hydroxy-12-keto-steroids are used as starting material.

4. A process according to claim 1, wherein the reaction is carried out under pressure with the use of a comparatively low boiling solvent.

5. A process according to claim 1, wherein a solvent is used which boils above about 160° C. and the reaction is carried out under atmospheric pressure.

6. A process according to claim 1, wherein the reaction mixture is temporarily heated to a temperature below about 160° C., the comparatively low-boiling portions are then distilled off, and the residue is then heated to above about 160° C.

7. A process which comprises heating 3β-hydroxy-11:12-diketo-iso-allo-spirostane with a hydrazine at a temperature above about 160° C. and in the absence of a basic alkali compound so as to produce 3β-hydroxy-11-keto-iso-allo-spirostane.

8. A process which comprises heating 11-enol-acetate of 3β-acetoxy-11:12-diketo-iso-allo-spirostane with a hydrazine at a temperature above about 160° C. and in the absence of a basic alkali compound so as to produce 3β-acetoxy-11-keto-iso-allo-spirostane.

9. A process which comprises heating $\Delta^{23:24}$-3α-acetoxy-11:12-diketo-24:24-diphenyl-cholene with a hydrazine at a temperature above about 160° C. and in the absence of a basic alkali compound so as to produce $\Delta^{23:24}$-3α-acetoxy-11-keto-24:24-diphenyl-cholene.

10. A process which comprises heating 3α-hydroxy-11:12-diketo-cholanic acid with a hydrazine at a temperature above about 160° C. and in the absence of a basic alkali compound so as to produce 3α-hydroxy-11-keto-cholanic acid.

11. A process for the partial removal of oxo-groups which comprises heating a member of the group consisting of an 11,12-diketo-steroid, enols and enolates thereof, said 11,12-diketo-steroid being a member of the pregnane series, to a temperature above about 160° C. with a member of the group consisting of hydrazine and derivatives thereof in the absence of a basic alkali metal compound.

References Cited in the file of this patent

"Organic Reactions," vol. 4, 1948, pp. 378–415.